United States Patent

Robertson et al.

[11] 3,939,295
[45] Feb. 17, 1976

[54] PROTECTIVE COATINGS AND FRITS THEREFOR

[75] Inventors: Robert Robertson, Warrington; Reginald Arthur Read, Lymm, both of England

[73] Assignee: Radiation Limited, London, England

[22] Filed: Dec. 22, 1972

[21] Appl. No.: 317,271

Related U.S. Application Data

[63] Continuation-in-part of Ser. No. 140,566, May 5, 1971, abandoned.

[30] Foreign Application Priority Data

May 12, 1970 United Kingdom............... 23039/70

[52] U.S. Cl................. 428/539; 106/48; 126/19 R; 427/376
[51] Int. Cl.² ..................... C32B 15/00; C23D 5/00
[58] Field of Search ............... 117/129, 70, 23, 53; 106/48; 126/19; 427/383, 376; 428/539

[56] References Cited
UNITED STATES PATENTS

| | | | |
|---|---|---|---|
| 2,492,523 | 12/1949 | Coffeen et al. | 117/129 |
| 2,753,271 | 7/1956 | Treptow | 106/48 |
| 3,460,523 | 8/1969 | Stiles | 126/19 |
| 3,547,098 | 12/1970 | Lee | 126/19 |
| 3,580,733 | 5/1971 | Ott | 106/48 |

FOREIGN PATENTS OR APPLICATIONS

| | | | |
|---|---|---|---|
| 1,197,067 | 7/1967 | United Kingdom | 106/48 |

*Primary Examiner*—Mayer Weinblatt
*Assistant Examiner*—Edith Buffalow
*Attorney, Agent, or Firm*—Brisebois & Kruger

[57] ABSTRACT

A process for coating a surface with a glass ceramic coating incorporating a catalyst, the process consisting of formulating glass ceramic frit to produce vitrification at low temperatures thereby providing a porous glass ceramic coating to act as a carrier for the catalyst. The catalyst may be one able to bring about oxidation of contamination produced by cooking food.

11 Claims, No Drawings

PROTECTIVE COATINGS AND FRITS THEREFOR

This application is a continuation-in-part of application Ser. No. 140,566, filed May 5, 1971, now abandoned.

BACKGROUND OF THE INVENTION

This invention relates to protective coatings and to methods of producing such coatings. The invention relates more particularly to protective coatings for component parts of domestic and catering cooking equipment.

Protection for such parts has, in the past, been provided by a vitreous enamel coating but whilst such coatings effectively protect the base metal of which the part is made for as long as the coating remains intact, it is found that contamination on the coating resulting from cooking operations is difficult to remove. It has been proposed to incorporate in the coating a substance sometimes referred to as an oxidising agent and sometimes as a catalyst which substance promotes the breakdown of such contamination and permits its erradication at temperatures within the range of normal cooking operations. Difficulty is, however, experienced in incorporating the substance in the coating to ensure effective performance of the coating without reducing the resistance of the coating to abrasion and rubbing to which it is sometimes exposed. Effectiveness of the substance is, to some extent, determined by the surface area or surface porosity over which the substance is distributed.

In conventional vitreous enamel coating processes it is found that the surface porosity of the slurry applied to a surface during the coating process is relatively high and remains so during drying and the initial stages of the final heating to fuse the dried slurry. As the sintering temperature is reached, the surface porosity drops rapidly in an uncontrollable manner to a very low value. At this stage the dried slurry has become fully fused and the resultant coating is extremely hard and smooth-surfaced.

For applications such as those referred to above, a hard coating is desirable because it resists abrasion well but it is found that the effectiveness of the substance is reduced, in many cases seriously, by the fully-fired nature of the coating.

DESCRIPTION OF THE INVENTION

Applicants have found it advantageous to use a glass ceramic of a special formulation instead of vitreous enamel. A glass ceramic is a polycrystalline solid prepared by the controlled crystallization of glasses which results in the nucleation and growth of crystalline phases within the glass. In glass ceramics, the crystalline phases are entirely produced by crystal growth from a homogeneous glass phase. Glass ceramics are distinguished from glasses by the presence of major amounts of crystals since glasses are amorphous or non-crystalline. The formulation brings about devitrification at a relatively low temperature and this reduces considerably the rate at which surface porosity reduces during the final heating. It is thus possible readily to control the final heating to enable a surface having a requisite extended surface area to be produced. In addition, it is found that not only is the surface of extended superficial area but the coating possesses a porosity that extends into the glass ceramic coating and voids occur within the latter to which access from the surface of the coating is possible. Such overall porosity cannot be accurately measured by techniques based on assessments of surface "roughness" but is readily measured by the known water uptake technique. Briefly, a coated test plate is weighed and the volume of the coating is measured. The plate is then fully immersed in water for two minutes after which the plate is removed and surface water removed. The plate is then re-weighed to permit the weight of water taken up to be calculated. The overall porosity of the coating is then given by the formula $$\text{porosity} = \frac{\text{weight of water absorbed}}{\text{volume of coating}} \times 100\%.$$

Applicants have further found out that, surprisingly, the reduction of effectiveness of the substance is very much less if the latter is not smelted in with the frit constituents but is added to the slip as a mill additive. Further, the presence of the substance enhances the devitrification of the glass ceramic coating referred to above.

According to the present invention, therefore, a process for providing a surface with a catalytically-active glass ceramic coating comprises the steps of i. producing a glass ceramic frit having a formulation lying within the ranges $SiO_2$ 30–70% by weight: $Al_2O_3$ 0–25% by weight: $LiO_2$ and/or $Na_2O$ and/or $K_2O$ (in total) 0–30% by weight: CaO and/or SrO and/or BaO and/or MgO (in total) 10–40;% by weight: ZnO 0–10% by weight, and $B_2O_3$ 0–20% by weight, ii. milling the frit to a fineness of from 2–20 grams on a 200 mesh sieve (50 ml sample), iii. preparing a slurry from the frit, iv. incorporating a catalyst in the slurry, v. coating the surface with the slurry and drying the same, and vi. firing the surface with the dried slurry at a temperature within the range of from 650°–950°C, to produce a fully-fired glass ceramic coating with a porosity in excess of about 20%.

The formulation may also include in proportion not exceeding 15% by weight of at least one of the constituents selected from the group consisting of $TiO_2$, $ZrO_2$ and $Sb_2O_3$.

In one embodiment of the process, the catalyst is one suitable for bringing about the oxidation of contamination produced by cooking food. Such a catalyst may include at least one oxide of a metal selected from the group consisting of iron, nickel, cobalt, manganese and copper.

The catalyst may be added in proportion of from 5–40%, preferably, 10–30% by weight of the catalyst.

The catalyst may be one of the catalysts described in British Pat. Specification No. 1,300,217 or that described in Belgian Pat. Specification No. 775,069, French Pat. Specification No. 71,40671 or German Pat. Specification No. 2,156,347, or it may be one of the catalysts described in the Specification of British Pat. Application No. 57758/70. The latter Specification discloses the use of a catalytic material in the form of porous aggregates each of which consists of mutually adherent catalyst particles.

The substance may be a catalyst suitable for some other process than that described above.

DESCRIPTION

Many of the examples to be described are suitable for the formation of protective coatings on those component parts of domestic and catering cooking equipment exposed to contamination by cooking fats and other deposits resulting from cooking operations. Typically, ovens are areas which suffer from much contamination but other areas are grilling chambers, rotisseries, and broilers.

Thus, the oven of a cooker may incorporate a removable liner or a series of removable panels and it is component parts of which these are examples that are coated in the manner now to be described.

The component part is a sheet of ferrous metal and is first treated to the conventional de-greasing and cleaning techniques commonly employed after which a ground coat of vitreous enamel is applied. The ground coat is formulated and applied in the conventional way. Alternatively, and preferably, a frit is employed which ensures better adhesion of the final coating.

The following Example 1 is of a glass ceramic frit falling within the formulation set out above:

| Constituents | % by weight |
| --- | --- |
| $SiO_2$ | 49.5 |
| $Al_2O_3$ | 3.6 |
| $B_2O_3$ | 8.4 |
| $K_2O$ | 8.3 |
| $Na_2O$ | 4.4 |
| CaO | 9.4 |
| MgO | 7.0 |
| BaO | 9.4 |
| ZnO | — |
| $MnO_2$ | — |
| CuO | — |
| | 100.0 |

The above compositions are made by mixing the following constituents together in a dry state and smelting in the usual way:

| Material | Parts by weight |
| --- | --- |
| Potassium Nitrate | 130 |
| Magnesium Carbonate | 106 |
| Calcium Carbonate | 122 |
| Alumina Hydrate | 40 |
| Quartz | 360 |
| Dehydrated Borax | 96 |
| Barium Carbonate | 90 |
| Felspar | — |
| Zinc Oxide | — |
| Sodium Carbonate (Anhydrous) | — |
| Manganese Dioxide | — |
| Copper Oxide | — |
| Smelting Temperature | 1250°C |

After water quenching of the frit, followed by drying to remove water the frits are milled as follows:-

| Frit (Example 1) | 100% | |
| --- | --- | --- |
| Milling Clay | 40 | |
| Sodium Nitrite | ¼% | % by weight |
| Catalyst | 10–40% | of frit |
| Water | 40–60% | |

Milling is effected to a fineness of 10 grams on a 200 mesh sieve (50 ml sample). The resultant slurry is applied over the ground coat in the conventional manner, dried and then fired, the fusing temperature being dependent upon the percentage of catalyst being within the range of from 650°–850°C.

A second Example will now be given of a formulation particularly suitable for use in the preparation of final coatings for use in atmospheres containing carbon dioxide and water vapour found in the ovens of domestic and commercial gas cookers.

| Constituents | Example 2<br>% by weight |
| --- | --- |
| $SiO_2$ | 42.0 |
| $Al_2O_3$ | 6.1 |
| $B_2O_3$ | 8.4 |
| $K_2O$ | 8.3 |
| $Na_2O$ | 4.4 |
| CaO | 9.4 |
| MgO | 7.0 |
| BaO | 9.4 |
| $ZrO_2$ | 5.0 |
| ZnO | — |
| $MnO_2$ | — |
| CuO | — |
| $TiO_2$ | — |
| | 100.0 |

The frit of Example 2 is made by mixing together in the dry state constituents as indicated in the following Table and then smelting in the usual manner:

| Constituent | Example 2<br>Parts by weight |
| --- | --- |
| Potassium Nitrate | 130 |
| Magnesium Carbonate | 106 |
| Calcium Carbonate | 122 |
| Alumina Hydrate | 68 |
| Quartz | 389 |
| Dehydrated Borax | 96 |
| Barium Carbonate | 90 |
| Zirconium Silicate | 55 |
| Felspar | — |
| Zinc Oxide | — |
| Sodium Carbonate (Anhydrous) | — |
| Manganese Dioxide | — |
| Copper Oxide | — |
| Titania | — |

After smelting at 1,200° to 1,250°C, the frit is quenched in water and then dried. The frit is then milled as follows:-

| Frit (Example 2) | 100% | |
| --- | --- | --- |
| Milling clay | 4% | |
| Sodium Nitrite | ¼% | % by weight |
| Catalyst | 0–40% | of frit |
| Water | 40–60% | |

The mixture is milled to a fineness of 10 grams on a 200 mesh sieve (50 ml. sample). The resulting slurry is applied in the conventional manner by the well known methods to ordinary ground coat or to special ground-coated steel.

Fusing temperature will depend upon the percentage of the catalyst present but will be in the range 770°–840°C.

The following two Examples 3 and 4 are of a glass ceramic frit suitable for use in an industrial process, a ground coat being formed on suitable substrate which may be of metal, ceramic or other suitable material. Subsequently, the glass ceramic coating is formed over the ground coat, the glass ceramic coating incorporating a catalyst or catalysts appropriate to the particular process.

Examples of two compositions suitable for the glass ceramic coating are as follows:-

| Constituents | Example 3 % by weight | Example 4 % by weight |
|---|---|---|
| $SiO_2$ | 43.9 | 47.8 |
| $Al_2O_3$ | 2.8 | 8.3 |
| $B_2O_3$ | 1.4 | 12.7 |
| $K_2O$ | 1.1 | 7.6 |
| CaO | 26.0 | — |
| $Na_2O$ | 14.9 | — |
| ZnO | 9.9 | — |
| MgO | — | 6.4 |
| SrO | — | 17.2 |
| | 100.0 | 100.0 |

The above compositions are made by mixing the following constituents together in a dry state and smelting in the usual way:

| Material | Example 3 Parts by weight | Example 4 Parts by weight |
|---|---|---|
| Felspar | 113 | — |
| Zinc Oxide | 77 | — |
| Calcium Carbonate | 370 | — |
| Sodium Carbonate (Anhydrous) | 181 | — |
| Dehydrated Borax | 16 | — |
| Quartz | 270 | 478 |
| Potassium Nitrate | — | 163 |
| Alumina Hydrate | — | 128 |
| Magnesium Carbonate | — | 134 |
| Strontium Carbonate | — | 254 |
| Boric Acid | — | 226 |
| Smelting temperature | 1200°C | 1300°C |

After water quenching of the frit followed by drying to remove the water each frit is milled as follows to form a slurry:

| Frit (Example 3 or 4) | 100% | |
|---|---|---|
| Milling clay | 4% | % by weight |
| Catalyst | 10–40% | of frit |
| Water | 40–60% | |

Milled to fineness of 10 grams in 200 mesh sieve (50 ml. sample).

The slurry of Example 3 will fuse on to a prepared sheet metal base at 650°–850°C (dependent on concentration of the catalyst).

The presence of the catalyst in concentrations referred to above when added to conventional vitreous enamel frits effectively destroys the ability of the coating to adhere directly to a metal surface and a ground coat must be applied to the latter first. However, the inclusion in a ceramic glass frit as disclosed above is found, surprisingly, not to destroy adhesion and the coating will adhere effectively directly to a metal surface, the ground coat being unnecessary.

The slurry of Example 4 will fuse on to a ceramic base at 850°–950°C (dependent on concentration of the catalyst and the nature of the ceramic base).

Surfaces exposed to contamination during cooking operations which have been treated by means of any of the techniques described above can be evaluated for effectiveness by means of the following simple test which is based on an estimation of the time required for the porosity of the surface to be restored following contamination by cooking oil:

1. Check the time for 1 drop of water (5 mg. of water) to be absorbed by the surface. Usually less than 20 seconds.
2. Heat the same test specimen to 270°C.
3. Add 1 drop of cooking oil (20 mg. drop of corn oil) to the surface.
4. Heat the specimen at a temperature of 270°C, for two hours.
5. After cooling again check time for 1 drop of water (5 mg. of water) to be absorbed. Water should be absorbed in less than 30 seconds.
6. If water is not absorbed in less than 30 seconds, re-heat specimen at 270°C for further two hours.
7. After cooling again check time for 1 drop of water (5 mg. of water) to be absorbed. Water should be absorbed in less than 30 seconds.

We claim:

1. A process for providing a surface with a catalytically-active glass ceramic coating comprising the steps of
   i. producing a glass ceramic frit having a formulation lying within the ranges $SiO_2$ 30–70% by weight: $Al_2O_3$ 0–25% by weight: $LiO_2$ and/or $Na_2O$ and/or $K_2O$ (in total) 0–30% by weight: CaO and/or SrO and/or BaO and/or MgO (in total) 10–40% by weight: ZnO 0–10% by weight: and $B_2O_3$ 0–20% by weight,
   ii. milling the frit to a fineness of from 2–20 grams on a 200 mesh sieve (50 ml. sample),
   iii. preparing a slurry from the frit,
   iv. incorporating a catalyst in the slurry,
   v. coating the surface with the slurry and drying the same, and,
   vi. firing the surface with the dried slurry at a temperature within the range of from 650°–950°C to produce a fully-fired glass ceramic coating with a porosity in excess of about 20%.

2. A process as claimed in claim 1 in which the formulation further includes, in a proportion not exceeding 15% by weight, at least one of the constituents selected from the group consisting of $TiO_2$, $ZrO_2$ and $Sb_2O_3$.

3. A process as claimed in claim 1 in which the catalyst is suitable for bringing about the oxidation of contamination produced by cooking food.

4. A process as claimed in claim 1 in which the catalyst comprises an oxide of at least one of the metals selected from the group consisting of iron, nickel, cobalt, manganese and copper.

5. A process as claimed in claim 1 in which the catalyst is added in a proportion by weight of from 10–40% of the weight of the frit.

6. A process as claimed in claim 1 in which the catalyst is added in a proportion by weight of from 5–30% of the weight of the frit.

7. A process as claimed in claim 1 in which the frit is of the formulation $SiO_2$ 49.5% by weight: $Al_2O_3$ 3.6% by weight: $B_2O_3$ 8.4% by weight: $K_2O$ 8.3% by weight: $Na_2O$ 4.4% by weight: CaO 9.4% by weight: MgO 7.0% by weight: BaO 9.4% by weight.

8. A process as claimed in claim 1 in which the frit is of the formulation $SiO_2$ 42.0% by weight: $Al_2O_3$ 6.1% by weight: $B_2O_3$ 8.4% by weight: $K_2O$ 8.3% by weight: $Na_2O$ 4.4% by weight: CaO 9.4% by weight: MgO 7.0% by weight: BaO 9.4% by weight: $ZrO_2$ 5.0% by weight.

9. A process as claimed in claim 1 in which the frit is of the formulation $SiO_2$ 43.9% by weight: $Al_2O_3$ 2.8% by weight: $B_2O_3$ 1.4% by weight: $K_2O$ 1.1% by weight: CaO 26.0% by weight: $Na_2O$ 14.9% by weight: ZnO 9.9% by weight.

10. A process as claimed in claim 1 in which the frit is of the formulation $SiO_2$ 47.8% by weight: $Al_2O_3$ 8.3% by weight: $B_2O_3$ 12.7% by weight: $K_2O$ 7.6% by weight: $MgO$ 6.4% by weight: $SrO$ 17.2% by weight.

11. A cooker part having a surface produced by the process as claimed in claim 1.

* * * * *